W. H. HILL.
SELF CLEANING TRACTOR WHEEL ATTACHMENT.
APPLICATION FILED DEC. 31, 1917.
1,334,699.
Patented Mar. 23, 1920.
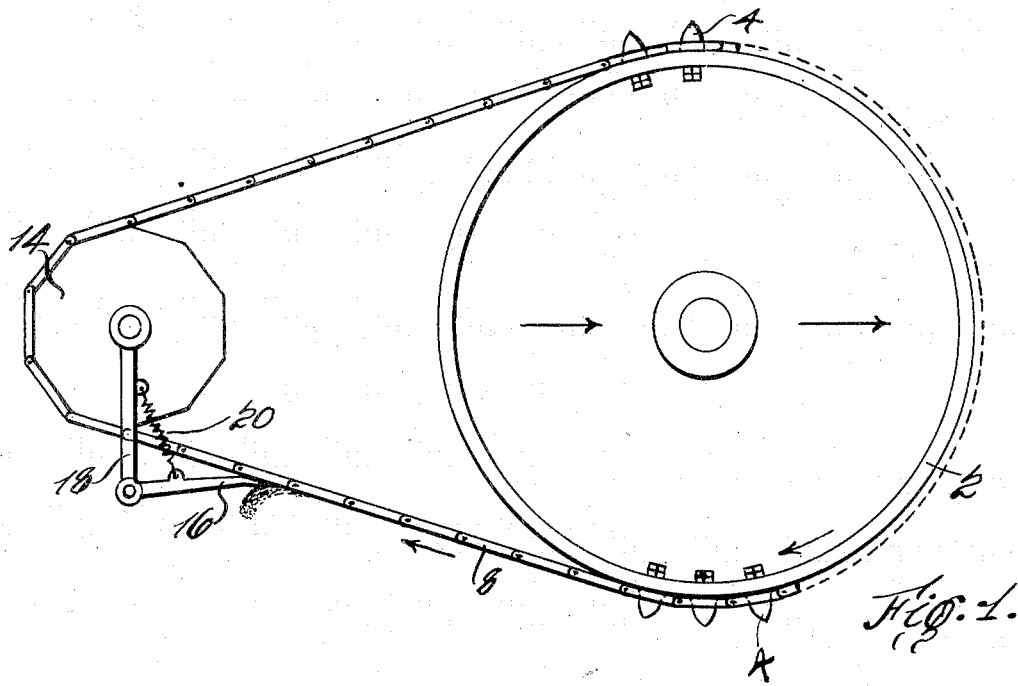
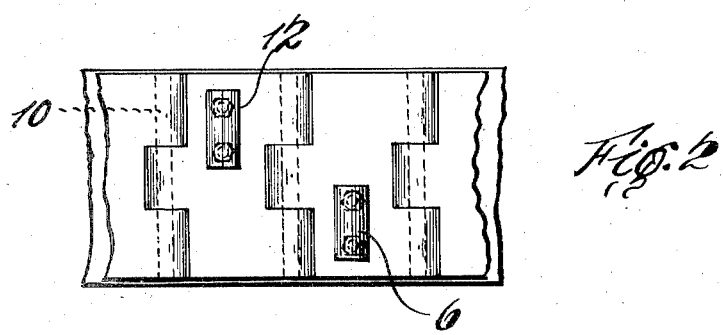
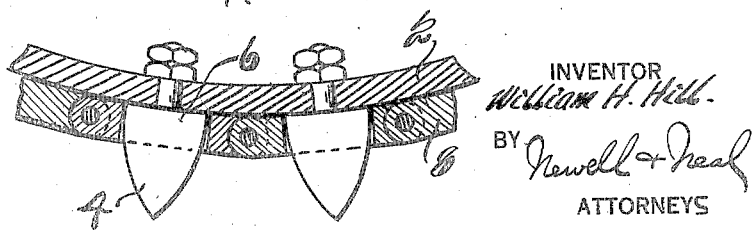
INVENTOR
William H. Hill.
BY Newell & Neal
ATTORNEYS

UNITED STATES PATENT OFFICE.

WILLIAM HENRY HILL, OF MANATI, PORTO RICO.

SELF-CLEANING TRACTOR-WHEEL ATTACHMENT.

1,334,699. Specification of Letters Patent. Patented Mar. 23, 1920.

Application filed December 31, 1917. Serial No. 209,644.

*To all whom it may concern:*

Be it known that I, WILLIAM HENRY HILL, a citizen of the United States, residing at Manati, Porto Rico, have invented certain new and useful Improvements in Self-Cleaning Tractor-Wheel Attachments, of which the following is a clear, full, and exact description.

This invention relates to means for keeping clean and effective the ground or road gripping parts of vehicle propelling means, such, for example, as the spurs, cleats or lugs of the driving wheels, caterpillar treads or chain treads of self-propelled vehicles.

A general object of the invention is to provide simple means for the above mentioned purpose, which can readily be applied to vehicles of well-known designs without material modification of the vehicle structure, and which will maintain the tractive means of the vehicle in effective condition.

Other objects and important features of the invention will appear from the following description and claims when considered in connection with the accompanying drawings, in which—

Figure 1 is a somewhat diagrammatic side elevation of a tractor wheel having applied thereto the cleaning means of the present invention;

Fig. 2 is a detail plan showing the spur or cleat stripping chain and its relationship to the spurs, and Fig. 3 is a detail view illustrating, in section, the structure shown in Fig. 2.

In the illustrated embodiment of the invention, a tractor wheel 2 is shown provided with ground gripping spurs 4 spaced about its periphery, only a few sets of these spurs being illustrated in the drawings, for the sake of convenience. These spurs may be formed, as shown in Fig. 2, with the rectangular bases 6, or in any other suitable manner.

A chain 8, made up of links hinged together by transverse hinge pins 10, is provided with spur embracing openings 12, through which the spurs project into engagement with the road or ground over which the vehicle is to be propelled by the tractor wheel 2, these openings 12 fitting the cleats 6 or spurs 4 closely enough so that when the chain separates from the tractor wheel 2 to pass over the idler drum 14, the dirt, mud or other material which has accumulated upon the spurs, by reason of their engagement with the road or ground over which the vehicle is traveling, will be stripped from the spurs by the movement of the chain out over the spurs, thus cleaning the spurs for their next ground engaging action.

The chain 8 is preferably only thick enough vertically to give it adequate strength for its cleaning action and is also preferably of the full width of the tread of the tractor wheel, whereby it cleans and protects the whole tractive surface of the tractor wheel. The apertures in the chain being completely filled by the rectangular bases 6, of the spurs when the chain is in engagement with the wheel tread, no dirt can get between the chain and the tread.

After the chain has separated from the wheel tread to effect the cleaning operation, the chain itself is preferably cleaned by any suitable device, such, for example, as the scraper 16 pivotally supported upon a depending bracket 18, and held in scraping engagement with the underside of the chain by the spring 20. Inasmuch as the chain itself does not transmit power and, when pressed against the ground, is backed by the surface of the wheel, it may be of relatively light construction.

What I claim as new is—

1. In a vehicle, the combination with ground engaging spurs and a movable carrier therefor, of a flexible belt interposed between the spur carrier and the ground and having spur embracing openings through which said spurs project into tractive engagement with the ground, said belt being supported to travel in a path diverging from that of said carrier, being driven by said carrier and operating to strip said spurs.

2. In a vehicle, the combination with ground engaging spurs and a movable carrier therefor, of a belt interposed between the spur carrier and the ground and having spur embracing openings through which said spurs project into tractive engagement with the ground, said belt traveling in a path diverging from that of said carrier, being driven by said carrier and operating to strip said spurs, and means, operating on said belt, after it has moved away from said carrier, for removing from said belt the material stripped from said spurs.

3. In a vehicle, the combination with a driving wheel provided with road engaging spurs, of an endless belt driven by said driving wheel, said belt having a portion located between said wheel and the ground and having spur embracing openings through which said wheel spurs project into engagement with the ground, and an idler at one side of said driving wheel over which said belt also passes.

4. In a vehicle, the combination with a driving wheel provided with ground engaging spurs, of an endless belt passing over said wheel, said belt being interposed between the wheel tread and the ground and having close fitting spur embracing openings through which said wheel spurs project into tractive engagement with the ground, and a second wheel over which said belt successively passes, whereby said belt operates to strip said spurs.

5. In a vehicle, the combination with a driving wheel provided with road engaging spurs, of an endless belt passing over said wheel and having spur embracing openings through which said wheel spurs project into tractive engagement with the ground, a second wheel over which said belt passes, said spurs closely fitting said belt openings at their bases and being curved from their bases outward to correspond to the disengaging relative movement of said belt and said spurs, whereby said belt operates to strip said spurs.

6. In a mud releaser, the combination with a tractor wheel having radially projecting tractor spurs on its periphery, of an endless chain traversing the periphery of the wheel and having openings formed by the links thereof so that the spurs may project through said openings, the chain being considerably longer than the circumference of the wheel, and a rotatable guide spaced from the wheel and supporting an intermediate portion of the chain, so that as the wheel rotates, the chain will be deflected intermediately from the surface thereof to permit the links to strip mud and other accumulations from the spurs.

Signed at San Juan, Porto Rico, this 30th day of November, 1917.

WILLIAM HENRY HILL.